March 2, 1965  R. L. DREYFUS  3,171,238
SEALING METHOD
Filed Dec. 31, 1962

United States Patent Office 3,171,238
Patented Mar. 2, 1965

3,171,238
SEALING METHOD
Robert L. Dreyfus, Greenville, S.C., assignor to W. R. Grace & Co., Duncan, S.C., a corporation of Connecticut
Filed Dec. 31, 1962, Ser. No. 248,691
5 Claims. (Cl. 53—30)

This invention relates to an improved method of sealing packages overwrapped in heat-shrinkable plastic film. The invention relates in particular to a method for sealing in a continuous manner overwrapped curvilinear packages such as whole chickens, hams and the like.

Irradiated polyethylene film which has been biaxially stretched has been found to be an excellent overwrap material. However, the high shrink energy of such film, advantageous for many purposes, causes certain wrapping problems. In particular, the shrink energy possessed by these films creates problems with regard to the sealing of multi-layer overwrap areas especially where it is desired to seal these areas and at the same time effect a "tight" fit between the product and the film. The prior art has suggested methods of surmounting these problems for essentially flat overwrapped products. Insofar as is known there has not yet been described a satisfactory method for sealing the multilayer overwraps of high shrink energy films where the overwrapped product has a curvilinear and/or irregular shape.

It is an object of the present invention to provide a method for securely sealing curvilinear and/or irregularly shaped packages overwrapped in heat shrinkable plastic film. Another object of the invention is to provide a method for permanently and securely sealing; on a continuous basis; curvilinear and/or irregular multilayer overwrap areas of high shrink energy plastic films. A specific object of the invention is to provide a rapid, effective method of packaging curvilinear and/or irregularly shaped products in irradiated biaxially stretched high shrink energy polyethylene film. Other objects will be apparent to those skilled in the art in view of the following more detailed description of the invention.

The invention will be described in connection with the attached drawing in which.

Figure 1:
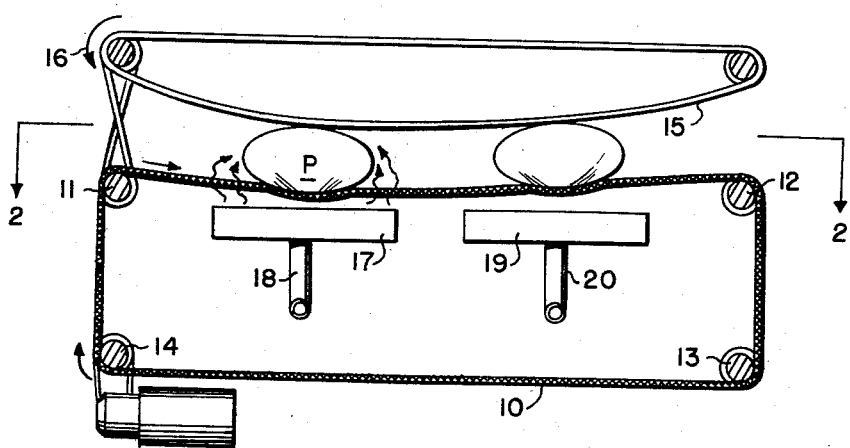
FIGURE 1 is a side elevation, taken at about line 1—1 of FIGURE 2, showing, in somewhat schematic form, means for performing the method of this invention.

Referring particularly to FIGURE 1, there is shown an endless flexible, foraminous conveyor belt 10 which travels continuously over driven rolls 11, 12, 13 and 14. An overwrapped irregular curvilinear product P, such as a wrapped whole ham, is placed on the endless, flexible, foraminous belt and held in place by an overhead weighted pressure belt 15, or some other equivalent means. The package is so placed between the two belts that the overlapped film areas lie beneath the product and in contact with the foraminous conveyor belt. In the embodiment illustrated the overhead pressure belt and the foraminous conveyor belt are driven so as to continuously carry the package in a left to right direction, as shown by directional arrow 16.

Figure 2:
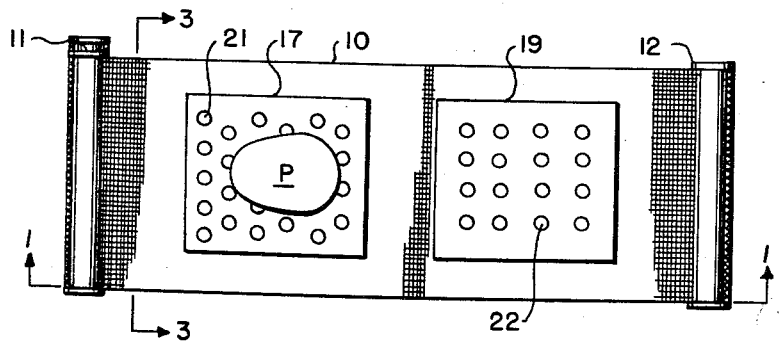
FIGURE 2 is a plan view taken on line 2—2 of FIGURE 1.
Figure 3:
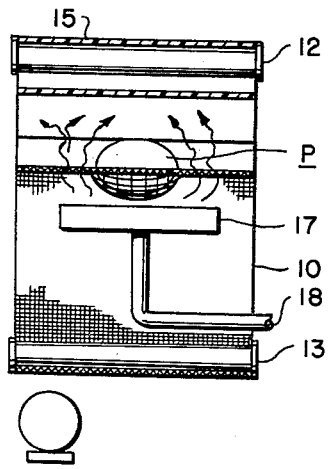
FIGURE 3 is an end elevation taken on line 3—3 of FIGURE 2.

Disposed beneath the foraminous conveyor belt are a pair of gas distribution means 17 and 19, supplied through conduits 18 and 20, respectively, from any suitable source (not shown). The distribution means comprise generally rectangular boxes having a plurality of holes 21 and 22 cut through the top (see FIGURE 2). Hot air or other suitable heated gas is fed to distribution box 17 and cold (e.g., room temperature) air or other suitable cooling gas is fed to the second distribution box 18.

In one example of practicing the method of the invention, a whole ham was overwrapped with a sheet of heat-shrinkable plastic film, preferably irradiated, biaxially polyethylene film. The film sheet was of sufficient size to completely cover the product and to provide overlapped edges for self sealing. In wrapping the so called "diaper-wrap" was used.

The overwrapped ham was placed on the flexible foraminous conveyor with the overlapped film edges down, i.e., placed to permit contact with the conveyor. The weight of the product gave sufficient pressure to hold the overlapped edges in place and the package was carried by the conveyor to a point proximate to the first gas distribution means. For relatively lightweight products the weighted pressure belt 15 on top of the package will cause the contour of the foraminous flexible conveyor to conform substantially to the underlying overlapped wrapping areas. If desired, the weighted pressure belt can also be used with heavier products.

Hot air, e.g., at about 400° Fahrenheit was fed through conduit 18 to the distribution box 17 and passed through the foraminous network of the conveyor to heat the overlapped film edges. In a short time (about 2 or 3 seconds) the overlapped areas became fused and heat sealed to each other. Since the conveyor is also flexible it substantially conformed to the irregular, curvilinear surface of the ham and film overwrap, thus restraining the overlapped areas during the heating step and precluding delamination of the seal due to shrinkage of the film wrapper. Furthermore, the substantial conformation gave a good seal along substantially the entire length of the curvilinear film overlap area. Because of the greatly increased seal area there was much less chance for subsequent real breakage. The possibility of liquid seepage into or out of the film wrapper was also substantially decreased.

The heat-sealed package next passed over gas distribution box 19 where cold air, e.g., at about room temperature, passes through the foraminous conveyor and sets the seal. The use of a cooling step is not essential but is generally preferred in order to speed up the packaging process. If desired, the sealed areas can be cooled in ambient atmosphere by increasing the length of the flexible foraminous conveyor beyond the heating station.

Any desired flexible foraminous conveyor can be used in the process of this invention. The preferred conveyor is an endless wire mesh belt. Overwrapped whole hams and whole chickens have been satisfactorily sealed by use of the inventive process using both 30 mesh and 80 mesh wire belts. Other mesh sizes could also be used, as well as other types of foraminous conveyors. It is essential in all cases, however, that the conveyor be flexible as well as foraminous so that substantial conformity of the conveyor to the curvilinear product will be obtained.

Other curvilinear and/or irregularly shaped products and other wrappings can be used in the method of this invention. Such products include, e.g., various cylindrical objects, round or spherical objects and the like. Depending upon the particular product and the particular package to be produced, wrappings can be the well known "diaper-wrap," "drugstore" wrap, tube wrap and so on. In all cases a much better package is produced because of the greatly increased sealed area resulting from use of the method described herein.

The single layer overwrap area can be heat shrunk into a tight "second skin" over the packaged product simultaneously with or subsequent to the heat sealing of the multi-layer overlapped areas. It is usually preferred to heat shrink the single layer overwrap area after the multi-layer heat seal has been completed.

It will, of course, be understood that the invention is not limited nor confined to the specific structural arrangement or the grouping of the units here shown, and that in the practice of the invention numerous changes, modifications and the full use of equivalents may be resorted to without departure from the spirit or scope of the invention as defined by the appended claims.

What is claimed is:

1. Method for heat sealing the multi-layer overwrap area of a curvilinear product wrapped in heat shrinkable plastic film comprising
    (a) placing the wrapped product upon a flexible foraminous support with the multi-layer overwrapped areas facing said support,
    (b) depressing said support with said product so as to maintain substantial conformity of the flexible support with the curvilinear overwrapped areas,
    (c) heating the multi-layer overwrap areas through the foraminous support to fuse the areas together while maintaining said conformity,
    (d) thereafter cooling the fused areas while maintaining said conformity until the fused areas are permanently set in sealed condition.

2. Method as defined in claim 1 including the further subsequent step of heating the single layer overwrap area to shrink the same into tight engagement with the product.

3. The method of claim 1 wherein said support is depressed by the weight of the products.

4. Continuous method for heat sealing the multi-layer overwrap area of a curvilinear product wrapped in heat shrinkable plastic film comprising:
    (a) placing the wrapped product upon a flexible foraminous belt conveyor with the multi-layer overwrapped areas facing said conveyor,
    (b) pressing upon the top of the wrapped product to bring the flexible conveyor into substantial conformity with the curvilinear overwrapped areas,
    (c) while continuously maintaining said conformity, conveying the wrapped product over a source of heat, whereby the overwrapped areas are heated through the flexible foraminous conveyor to fuse the overwrapped areas together,
    (d) thereafter cooling the fused areas while maintaining said conforming pressure until the heated areas have become cooled and permanently set in sealed condition.

5. Method as defined in claim 4 including the further subsequent step of heating the single layer overwrap area to shrink the same into tight engagement with the product.

References Cited by the Examiner

UNITED STATES PATENTS

| | | | |
|---|---|---|---|
| 3,113,874 | 12/63 | Baush et al. | 53—30 X |
| 3,120,728 | 2/64 | Snow et al. | 53—42 |

FRANK E. BAILEY, *Primary Examiner.*

TRAVIS S. McGEHEE, *Examiner.*